UNITED STATES PATENT OFFICE.

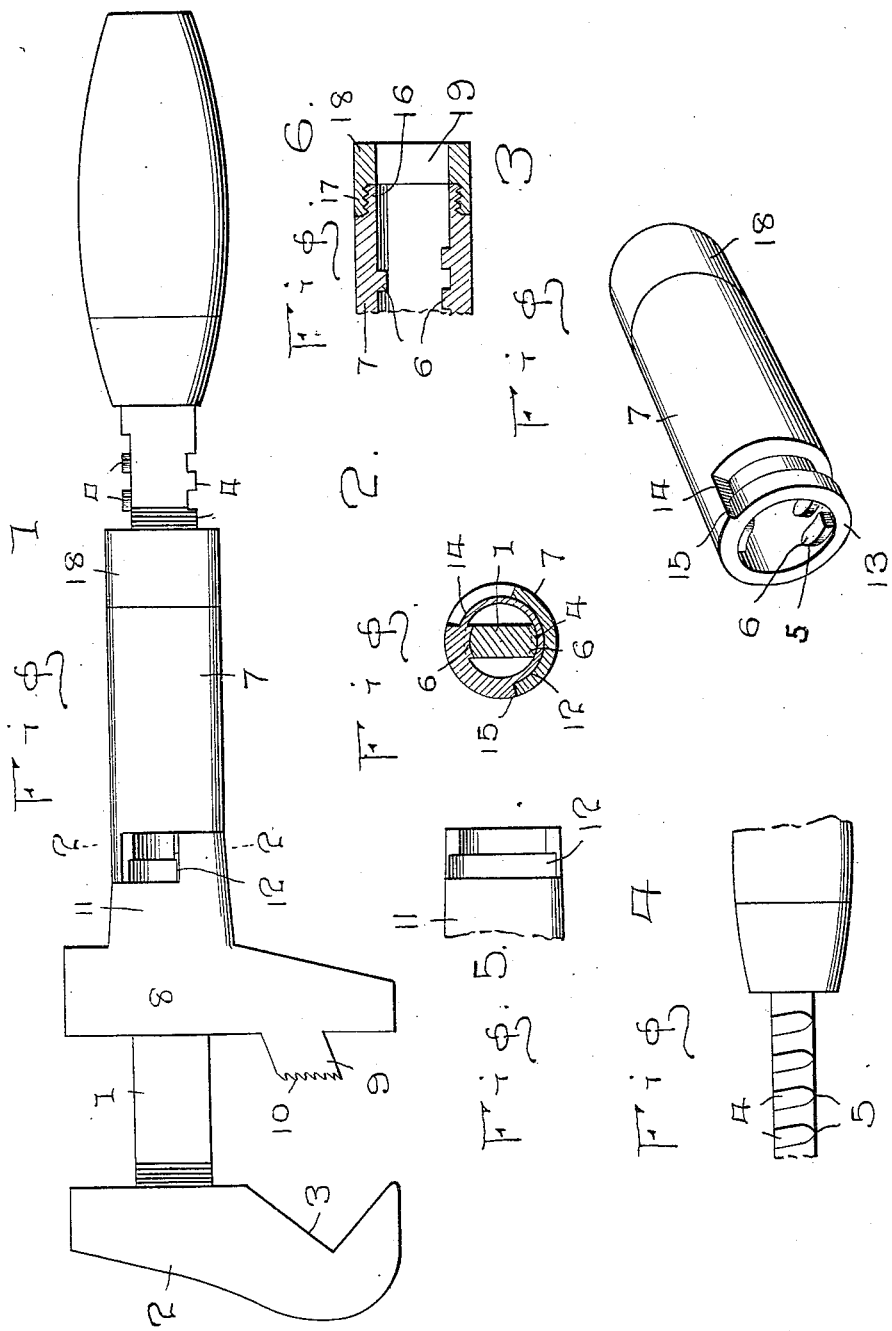

JAMES F. CROWL, OF FAIRMONT, WEST VIRGINIA.

WRENCH.

946,498.  Specification of Letters Patent.  Patented Jan. 11, 1910.

Application filed May 12, 1908. Serial No. 432,468.

*To all whom it may concern:*

Be it known that I, JAMES F. CROWL, a citizen of the United States, residing at Fairmont, in the county of Marion and State of West Virginia, have invented certain new and useful Improvements in Wrenches; and I do hereby declare the following to be a full, clear, and exact description of the invention, such as will enable others skilled in the art to which it appertains to make and use the same.

This invention relates to new and useful improvements in wrenches and has primarily for its object to provide a novel device of this character, wherein an instantaneous adjustment of the jaws may be effected.

It is also an object of the invention to provide a novel device of this character wherein are employed interrupted threads, said threads having certain of their ends so shaped as to assure a proper engagement.

It is also an object of the invention to provide a novel device of this character, which may be used for ordinary purposes and as a pipe wrench.

It is also an object of the invention to provide a novel device of this character, which will be simple in construction, efficient and advantageous in practice and comparatively inexpensive to manufacture.

With the above and other objects in view, the invention consists in the details of construction and in the novel arrangement and combination of parts to be hereinafter referred to.

In describing the invention in detail, reference will be had to the accompanying drawings forming part of this specification, wherein like characters of reference denote corresponding parts in the several views, and in which, Figure 1 is a view in side elevation of the device. Fig. 2 is a sectional view on the line 2—2, Fig. 1. Fig. 3 is a view in perspective, detached, of a locking sleeve employed in conjunction with the invention. Fig. 4 is a fragmentary view in end elevation illustrating in detail the formation of the teeth carried by the shank. Fig. 5 is a fragmentary view in elevation, illustrating a detail of the invention. Fig. 6 is a fragmentary view in section, illustrating a detail of the invention.

In the drawings, 1 denotes the shank of the wrench, which is preferably rectangular in cross section and 2, the stationary jaw affixed to one end thereof. This jaw extends to either side of the shank and one of the projected portions is provided with the V-shaped notch 3, which permits the device to be employed as a pipe wrench. The major portion of each of the end faces of the shank 1, are provided with a plurality of teeth 4, so arranged as to form interrupted threads and an end 5 of each thread is beveled as shown particularly in Fig. 4 to readily permit engagement therewith of the teeth 6 carried by the sleeve 7, to be hereinafter referred to.

Slidably mounted on the shank 1, is the movable jaw 8, which also projects to either side of the shank 1 and that portion of the jaw 8 beneath the notch 3 of the jaw 2 has an upwardly extending lug 9, the free end face of the lug being serrated or toothed as at 10. This lug 9 is also arranged on an upwardly and outwardly disposed incline. The lug acting in conjunction with the notch 3, forms an effective grip for a pipe and permits the device to be used with great advantage as a pipe wrench.

Rotatably mounted on the shank 1, is the sleeve 7 before referred to, having on its interior surface at opposed points, the teeth 6, which are adapted to intermesh with the teeth of the shank. It is also to be observed that certain ends of these teeth 6 are beveled for a purpose mentioned with respect to the teeth 4.

One end portion of the movable jaw 8 has a segmental depending lug 11 having its inner face provided with a groove 12, into which extends a segmental flange 13 positioned within a reduced portion 14 of the upper end of the sleeve 7. By this arrangement, shoulders 15 are formed which abut with the ends of the lug 11 and limit the rotary movement of the sleeve 7. The lug 11 and the reduced portion 14 are so positioned in this instance as to permit a ¼ revolution of the sleeve 7 about the shank 1. It will thus be seen that when the sleeve 7 is at the limit of its movement in one direction, the teeth 6 thereof will be in mesh with the teeth 4 of the shank 1, and the movable jaw 8 will be effectually held against movement and that when the sleeve 7 is at its limit in an opposite direction, the teeth 6 and 4 will be disengaged and the jaw 8 can be readily and instantaneously moved in any desired position on the shank 1.

It is to be observed that the beveled ends of the teeth 4 and 6 are opposed one to the other in order that when the sleeve 7 is turned to effect a lock, the teeth will readily intermesh, as is believed to be apparent. Attention is also directed to the fact that the notch 3 is of such depth as to permit the lug 9 to extend therein in order that the straight opposed faces of the jaws 2 and 8 may contact.

The lower end of the sleeve 7 is reduced, as at 16 and the exterior portion thereof is screw threaded to be engaged by the threads on the inner wall of the reduced portion 17 carried by an auxiliary sleeve. This auxiliary sleeve has the same exterior form as the sleeve 7, but has its bore 19 so as to fit the shank snugly, said sleeve having its bore of corresponding rectangular cross-section with that of the shank of the fixed jaw member. This auxiliary sleeve 18 is provided to protect the sleeve 7 from becoming filled with dirt and to hold the sleeve in position at all times. It also greatly enhances the strength of the wrench.

What I claim is:

A device of the character described, comprising a fixed jaw member having an angular shank, a movable jaw member, a sleeve member and a supplemental sleeve member, said fixed jaw member having its shank provided with opposed teeth or threads, said movable jaw member receiving said shank of said fixed jaw member, the first-referred-to sleeve member having opposed teeth or threads engaging the teeth of said fixed jaw shank, said movable jaw member also having a segmental like recess, said first referred to sleeve member also having a segmental like reduction provided with a corresponding shoulder adapted to be received by said segmental like recess of said movable jaw member, said first-referred to sleeve member also having shoulders at the lateral terminals of the segmental-like reduction adapted for engagement with the corresponding portions of said movable jaw for limiting the rotation of said sleeve, said supplementary sleeve member having screw-threaded connection with the first-referred to sleeve member, the bore of said supplementary sleeve member being angular in cross section and adapted to receive the correspondingly shaped fixed jaw shank to aid said screw threaded connection in effecting the retention of said first-referred to sleeve member against casual turning.

In testimony whereof I have signed my name to this specification in the presence of two subscribing witnesses.

JAMES F. CROWL.

Witnesses:
W. V. R. LARSH,
JAS. L. GETTINGS.